INVENTORS
GROVER W. RYE
OWEN B. FUNSCH

*Bosworth, Sessions,
Herrstrom & Knowles*
ATTORNEYS

April 20, 1971  O. B. FUNSCH ET AL  3,575,761
FLEXING TREATMENT OF TEXTILE CORDS
Filed Jan. 16, 1967  5 Sheets-Sheet 3

INVENTORS
GROVER W. RYE
OWEN B. FUNSCH
BY
Bosworth, Sessions,
Herrstrom & Knowles
ATTORNEYS

INVENTORS
GROVER W. RYE
OWEN B. FUNSCH
BY
ATTORNEYS

United States Patent Office 3,575,761
Patented Apr. 20, 1971

3,575,761
FLEXING TREATMENT OF TEXTILE CORDS
Owen B. Funsch, Akron, and Grover W. Rye, Cuyahoga Falls, Ohio, assignors to The Goodyear Tire & Rubber Company, Akron, Ohio
Filed Jan. 16, 1967, Ser. No. 609,502
Int. Cl. B29h 17/28
U.S. Cl. 156—199                                      9 Claims

ABSTRACT OF THE DISCLOSURE

A method and apparatus for treating textile cords formed of thermoplastic fibers such as nylon and polyester and especially the cords used in the manufacture of pneumatic tires where the cords are normally coated with an adhesive and hot-stretched. The treatment includes drawing the cords longitudinally while under tension over an edge or other means to provide a bend in or to flex the cords and reduce their stiffness.

BACKGROUND OF THE INVENTION

The invention relates to the processing of continuous lengths of textile cords, particularly cords formed of synthetic fibers such as nylon or polyester. The invention is especially applicable to the processing of fabric formed of such textile cords arranged in parallel longitudinal relation and held together by spaced lateral warp threads. Such fabric is used extensively in the reinforcing of rubber laminates such as pneumatic tires.

During a typical processing of textile fabric for reinforcing rubber laminates, the fabric is coated with a suitable adhesive which bonds the rubber to the textile cords of the fabric during vulcanization. The cords are then dried and hot-stretched to impart the desired physical properties, especially to minimize the extensibility. After the coating and hot-stretching, the fabric is passed through calender rolls where an uncured rubber ply compound is applied to both sides to form a rubberized sheet.

The resulting product is then cut to size, and laminated to form a desired raw or uncured rubber article such as as uncured pneumatic tire. In forming a conventional pneumatic tire a plurality of plies are wrapped around a tire building drum or form and annular metal beads placed adjacent each end of the resulting generally cylindrical laminate. The end portions of the cylindrical laminate spaced outwardly from the beads are then turned either up and back over the beads or down and back under the beads and pressed against the adjacent plies. In the case of larger tires such as truck tires the stiffness of the plies often requires that the operation of turning back the ply ends be done a few plies at a time rather than all at once. After a band of uncured tread rubber is applied the uncured tire is shaped and vulcanized.

The operation of turning up or turning down the ends of the cylindrical plies around the beads presents unique problems when synthetic fibers such as nylon and polyester are used for the reinforcing cords because while the cords are not particularly stiff before being dipped and hot-stretched they are quite stiff afterwards, and are also substantially impervious to air.

Due to the stiffness of cords, the plies may resist the sharp fold around the beads and in some instances do not bend sharply enough to conform closely to the beads. Consequently, air is occasionally entrapped between the plies adjacent the beads. This condition is especially undesirable since the entrapped gases expand and may damage the tire carcass during or after vulcanization.

The textile cords of tire cord fabric are pervious to gas before being coated with an adhesive and hot-stretched since the individual filaments of the cords are generally round in cross-section and define interstices with the adjacent filaments. The adhesive coating, however, tends to seal the outside of the cords making them substantially impervious. Also, the hot-stretching tends to deform the filaments of the cords in cross-section so that they are more nearly polygonal and tend to fit together in close conformance with adjacent filaments. The result of this is a substantial reduction in any ability of the cord to absorb the gases.

The present invention overcomes the difficulties indicated above and affords other features and advantages not obtainable from the prior art.

SUMMARY OF THE INVENTION

According to one aspect of the invention, textile cords to be used in reinforcing rubber laminates are processed by the method comprising:
(1) tensioning a textile cord, and
(2) drawing the tensioned cord longitudinally across a cord flexing member defining a relatively sharp bend, the cord being flexed progressively along its length at the bend while passing across the member.

In the preferred form, the bend has a radius of curvature which is quite small but greater than the minimum radius of flexure which the cord can accommodate without experiencing physical injury. The tension maintained in the cord is sufficient to place the cord in close conformance with the bend defined by the flexing member.

Where the invention is used in the processing of fabric formed of parallel continuous textile cords to be embedded in rubber and used to reinforce laminated rubber articles, the method comprises:
(1) tensioning a continuous web of the fabric,
(2) drawing the tensioned web longitudinally across a cord flexing member defining a relatively sharp bend, the cords of the web being flexed progressively along their length at the bend while passing across the member,
(3) embedding the web in uncured rubber to form a rubberized sheet,
(4) forming a laminated article of the sheet, and
(5) vulcanizing the article.

In connection with the processing of thermoplastic cord, the flexing of the cords while under tension is advantageously accomplished after the cords have been hot-stretched and cooled. Where the web is coated with an adhesive during the processing, the flexing is advantageously accomplished after the coating has dried on the cords.

The apparatus of the invention is used in connection with equipment for tensioning and conveying a continuous web of fabric formed of parallel continuous textile cords and comprises a cord flexing member extending transversely of the web, and means for supporting the cord flexing member whereby the member engages and flexes the tensioned web being conveyed.

According to one form of apparatus of the invention, the cord flexing member is a tubular bar supported by spaced parallel arms connected at one end to opposite ends of the cord flexing member and supported at their other ends for pivotal movement about a common axis. Means are provided for pivoting the arms between a position wherein the cord flexing member is out of engagement with the web and a position wherein the cord flexing member is in engagement with the web to displace the web out of its normal path of travel and thus effect a change in direction in the web.

According to another form of the apparatus of the invention, a plurality of cord flexing members are provided, each extending transversely of the web. The flexing members are positioned so that the web is constrained to move through a zig-zag path of travel.

The invention also contemplates a web of fabric comprising parallel continuous textile cords formed of thermoplastic fibers, the cords having been hot-stretched and thereafter drawn, while under tension, across a cord flexing member according to the method summarized above. The types of thermoplastic fibers include but are not limited to nylon and polyester.

The invention also contemplates a sheet of reinforced rubber comprising a web of fabric as described above embedded in uncured rubber, and also a reinforced rubber laminate comprising superposed plies made up of such sheets of reinforced rubber, the laminate having been vulcanized. A particular reinforced rubber laminate which the invention contemplates is a pneumatic tire, the tire so constructed having improved flexure characteristics and affording a softer ride than a tire made with conventionally processed cords.

The principal advantages of the invention as applied particularly to pneumatic tires reside, first of all, in the improved facility with which the ends of the cylindrical plies formed during the building of a tire on a tire building drum may be turned around the metal beads and folded against the adjacent plies. The reduced stiffness enables the plies to bend into close conformance with the beads so that entrapped air pockets are minimized with a resulting reduction in defective tires which must be rejected.

Secondly, it is believed that the flexing of the cords after being dipped and hot-stretched tends to rupture the otherwise impervious coating of adhesive and also tends to work the filaments of the cords out of close conformance to one another and thus enlarge the interstices between them. Consequently, it is believed that the pressure of any gas which may be entrapped in the plies may be relieved while the tire is in the vulcanizing mold or press, through the release of gas into the reservoir provided by the cords.

Thirdly, the flexing of the cords reduces their stiffness while at the same time unexpectedly improving their physical characteristics such as breaking strength and fatigue resistance. Also, the resulting tire is more flexible and provides a more comfortable ride.

It is among the objects of the invention to improve the processability of sheet material or plies formed of textile cords embedded in uncured rubber.

Another object of the invention is to reduce defects which occur during the vulcanizing of pneumatic tires and rubber laminates due to the expansion of gas entrapped between the plies.

A further object of the invention is to provide improved folding of cord reinforced plies over the metal beads used in the construction of pneumatic tires.

Other objects, uses and advantages of the invention will be apparent from the following detailed description and drawings.

DESCRIPTION OF THE PREFERRED EMBODIMENTS

Figure 6:
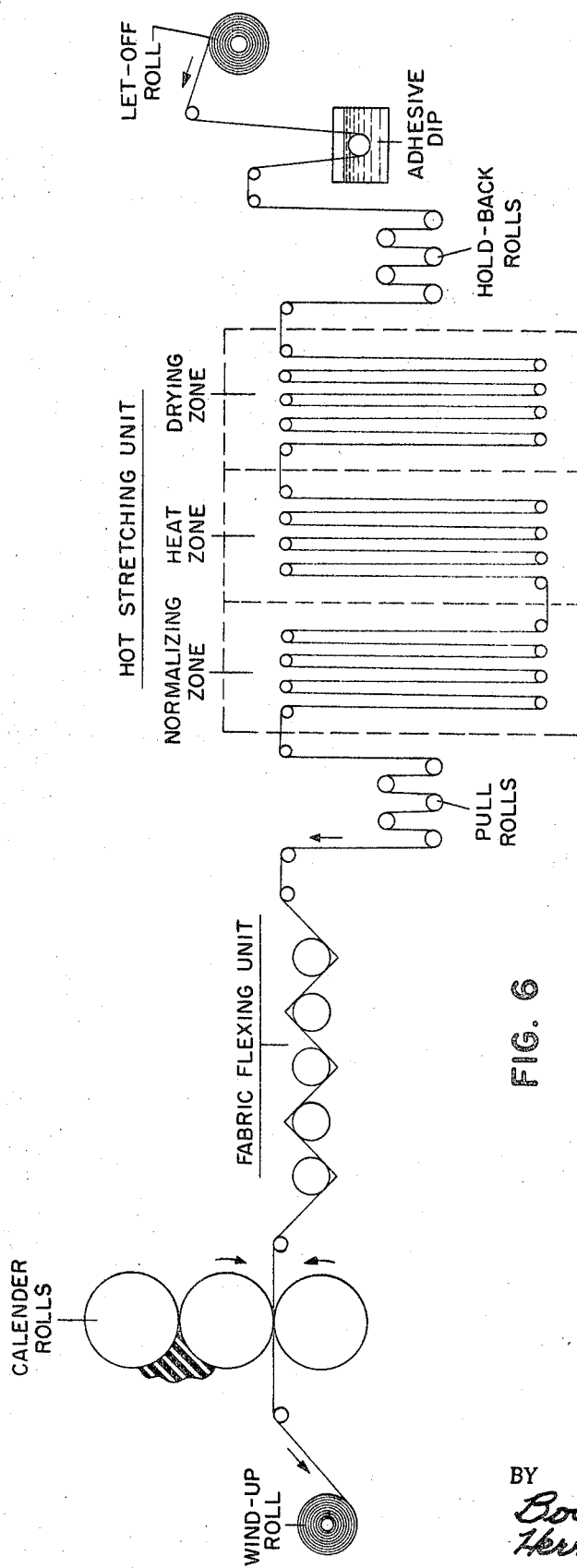
FIG. 6 is a schematic diagram of a fabric processing line, including equipment for processing fabric according to the invention.

In the drawings FIGS. 1 to 4 show a fabric flexing apparatus A for practicing the method of the invention. The apparatus is shown as being incorporated in a tire cord fabric processing line wherein a continuous web of tire cord fabric formed of parallel longitudinal textile cords is coated with an adhesive, dried and hot-stretched prior to being passed through calender rolls where the web is embedded between layers of uncured rubber (FIG. 6). The apparatus is preferably located at a position in the line where the fabric has already been coated with an adhesive, dried and hot-stretched, and where the tension in the cords is relatively low, for example from .5 to 4 lbs. per cord for conventionol nylon cords for passenger car tires. The location shown in FIG. 6, just prior to the calendering unit is particularly suitable.

Figure 1:
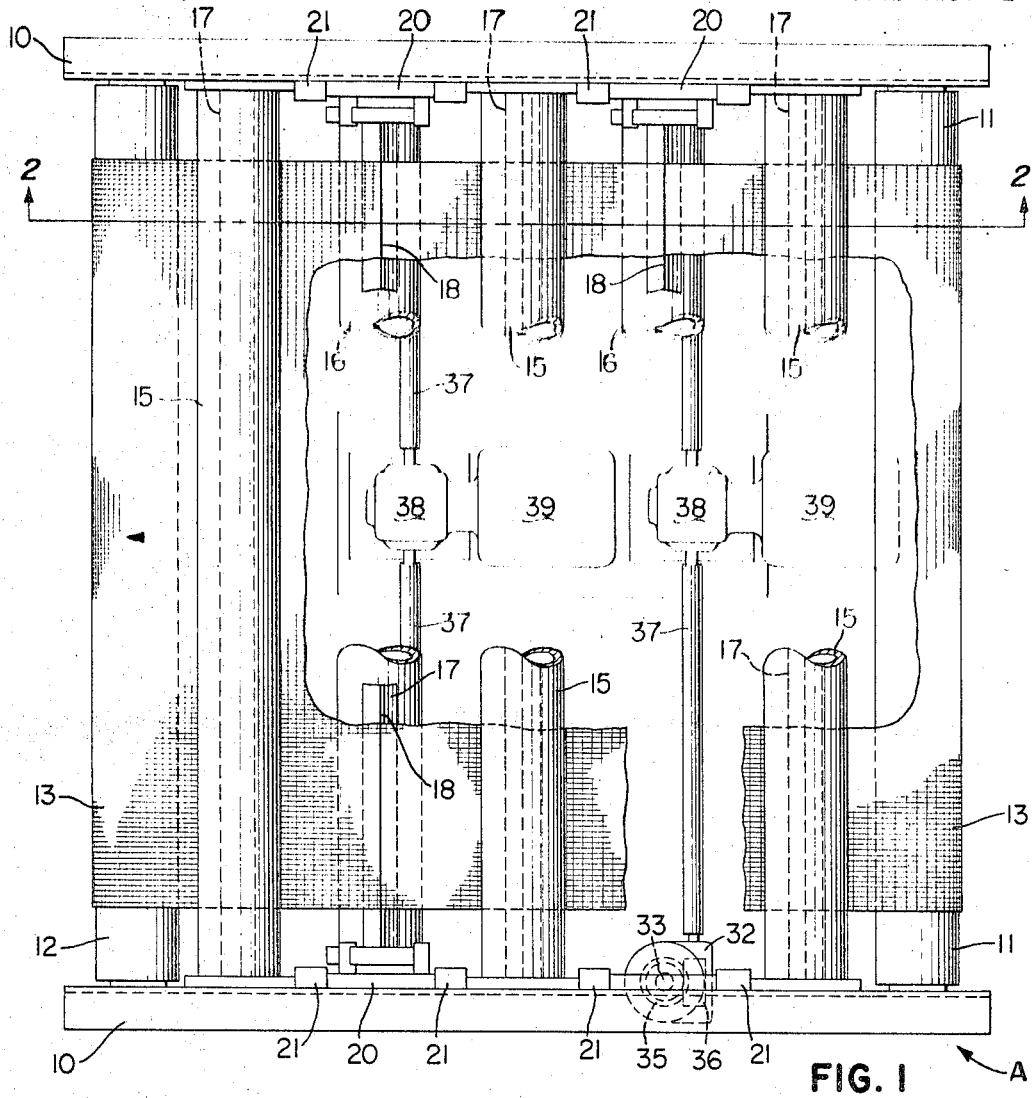
FIG. 1 is a plan view with parts broken away and shown in section of an apparatus for practicing the method of the invention.
Figure 2:
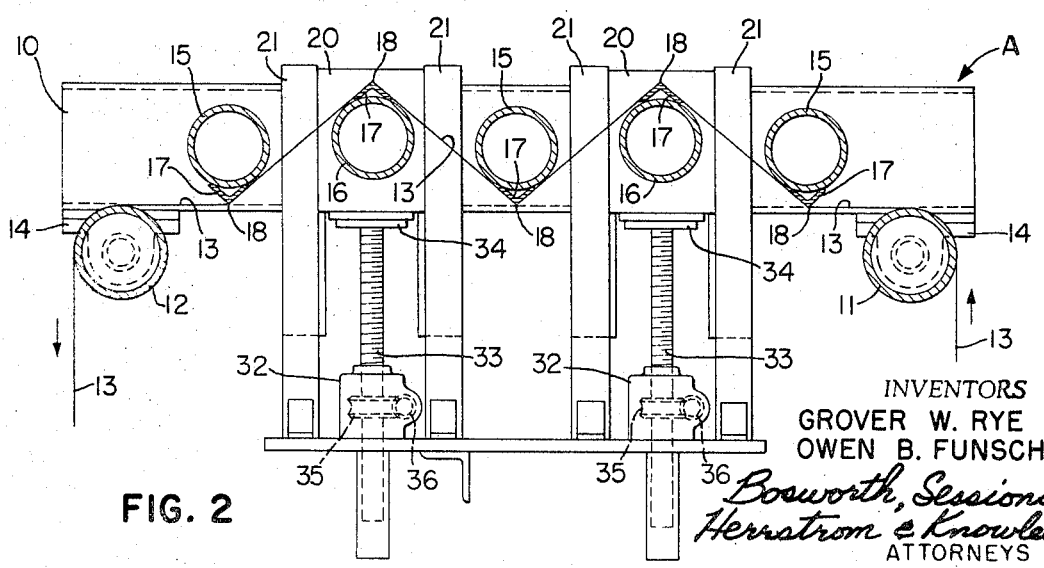
FIG. 2 is a sectional view taken on the line 2—2 of FIG. 1.

The apparatus A comprises two parallel frame members 10 that support idler rolls 11 and 12 at opposite ends of the apparatus which are adapted to guide a continuous web 13 of tire cord fabric. The rolls 11 and 12 are mounted in bearings 14 secured to the bottom of the frame members 10 as shown in FIG. 2. Extending between the frame members 10 parallel to one another and perpendicular to the path of travel of the tire cord fabric 13 are three stationary tubular supports 15 spaced from one another, and two adjustable tubular supports 16 located in the spaces between the supports 15.

Each of the supports 15 and 16 has secured thereto a fabric flexing bar 17 which extends longitudinally along each support 15 and 16 from end to end and which is L-shaped in cross section. The apex of each bar 17 faces away from its support and defines an edge 18 formed with a radius of about .050 inch, the edges being adapted to engage the fabric web 13 and flex it according to the invention. The bars 17 face downwardly from the tubular supports 15 and upwardly from the tubular supports 16 as shown in FIG. 2. Accordingly, the path of travel of the fabric web 13 through the apparatus A follows a zigzag course with the fabric bending around the edges 18.

Figure 3:
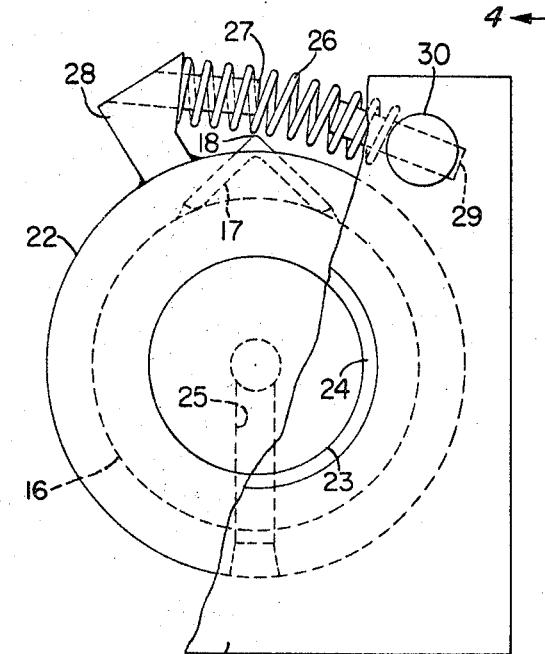
FIG. 3 is an end elevational view on an enlarged scale with parts broken away and shown in section, of a fabric flexing bar of the apparatus of FIG. 1.
Figure 4:
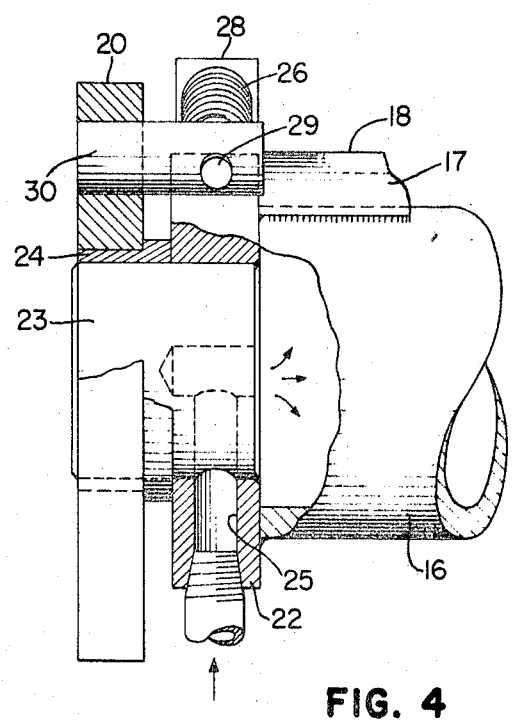
FIG. 4 is a sectional view with parts broken away taken on the line 4—4 of FIG. 3.

The adjustable tubular supports 16 are carried at each end by slide blocks 20 received in vertical guides 21 secured to the frame members 10. FIGS. 3 and 4, illustrate the attachment of the adjustable tubular supports 16 to the slide blocks 20, the supports 16 being welded or otherwise secured at each end to carrier plates 22 each of which is mounted on a bearing 23 which is journaled at its opposite end in a bushing 24 mounted in the slide block 20. Each carrier plate 22 has a passage 25 formed therein which communicates with the interior of a tubular support 16 and which provides an access for a cooling fluid for cooling the supports 15 and 16.

The supports 16 are mounted for rotary movement relative to the slide blocks 20 as indicated and are biased to the position shown in FIGS. 3 and 4 by means of coil tension springs 26. Each spring 26 is supported at one end on a pin 27 secured to a bracket 28 mounted on the carrier plate 22. The other end of the spring 26 is supported on a pin 29 mounted on a rod 30 secured to the slide block 20. The springs serve to dampen the initial stress exerted on the fabric during changes in line speed and when the vertical positions of the supports 16 are changed while the fabric web 13 is in motion.

Vertical adjustment of the slide blocks 20 is accomplished by means of screw jacks 32, the jacks each comprising a threaded plunger 33, a top plate 34 which engages a slide block 20, and a helical gear 35. The helical gear is threaded on the plunger 33 and mounted for rotary movement so that turning of the helical gear 35 either raises or lowers the plunger 33. The teeth of the helical gear 35 are engaged by a worm 36 mounted at the end of a drive shaft 37. The drive shafts 37 extend from opposite ends of bevel gear units 38 driven by motors 39. Accordingly, the motor 39 may be used to adjust either of the supports 16 to a desired height for obtaining the desired angle of flexure for the fabric web 13 as it passes through the apparatus A.

Figure 5:
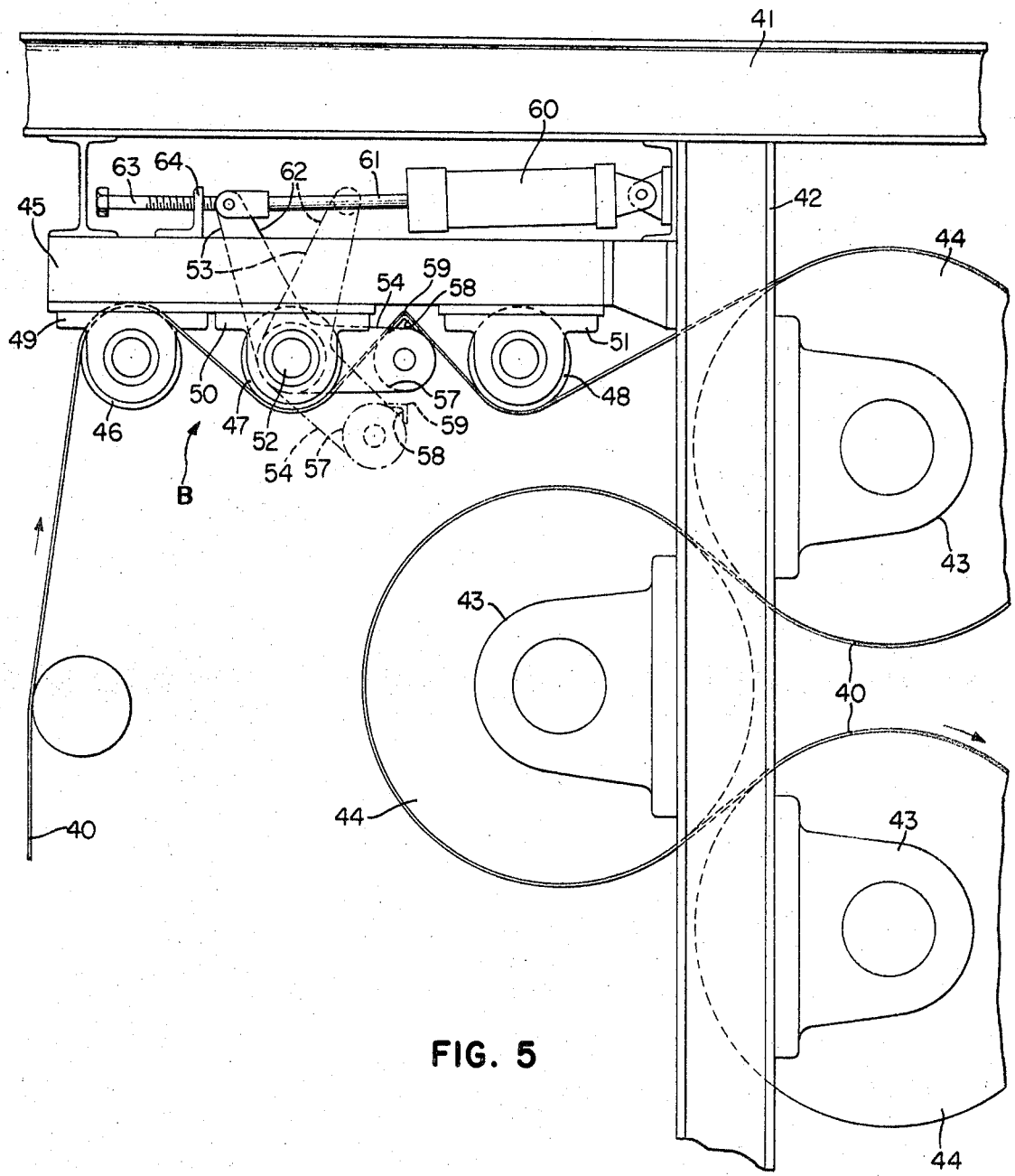
FIG. 5 is an elevational view showing another fabric flexing apparatus for practicing the method of the invention.

FIG. 5 shows another type of fabric flexing apparatus B adapted for use in practicing the method of the invention. The apparatus B is adapated for installation in existing fabric conveying equipment with a minimum of structural modification. The existing equipment includes means for conveying a continuous web 40 of tire cord fabric which includes a frame formed of structural members including horizontal members 41 and vertical members 42, the members 41 and 42 on only one side of the frame being shown in FIG. 5. The vertical member 42 supports bearing mounts 43 which carry rolls 44, the web 40 being wrapped around the rolls 44 as shown and passed to other portions of the fabric conveying equipment. Mounted below each horizontal frame member 41 is a structural beam 45 each of which supports one end of three idler rolls 46, 47 and 48 mounted in bearing mounts 49, 50 and 51. The bearing mounts 49, 50 and 51 support the idler rolls 46, 47 and 48 which guide the fabric web 40 in the manner shown. Extending outwardly from each of the bearing mounts 50 are pins 52, each of which carries a bell crank 53. A tubular support 57 extending laterally across the apparatus B parallel to the idler rolls 46, 46 and 48 is mounted between the ends of one arm 54 of each bell crank 53. Secured to the support 57 and extending longitudinally between the ends thereof is a fabric flexing bar 58 mounted with its apex extending upwardly from the support 57. The apex of the bar 58 provides a flexing edge 59 that is formed with a radius of curvature of about .050 inch. The bell cranks 53 at each end of the frame 41 are movable between a fabric flexing position shown in solid lines in FIG. 5 and an inoperative position shown in dashed lines in FIG. 5. The movement between the two positions is accomplished by means of hydraulic cylinders 60, one being mounted on each side of the frame. Each cylinder 60 has a piston rod 61 pivotally connected to an arm 62 of the bell crank 53. A bolt 63 received in a threaded opening in a bracket 64 serves as an adjustable stop which limits the fabric flexing position of the bar 58. When the fabric flexing bar 58 is in the flexing position it engages and flexes the fabric web 40 between the rolls 47 and 48 so that the fabric defines an included angle of about 100°.

OPERATION

Figure 7:
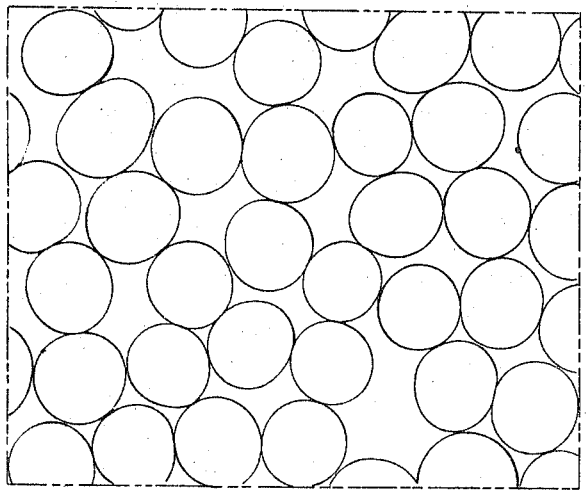
FIG. 7 is a greatly enlarged somewhat diagrammatic cross section of a portion of a textile cord which has not yet been processed for use in reinforcing rubberized laminates.
Figure 8:
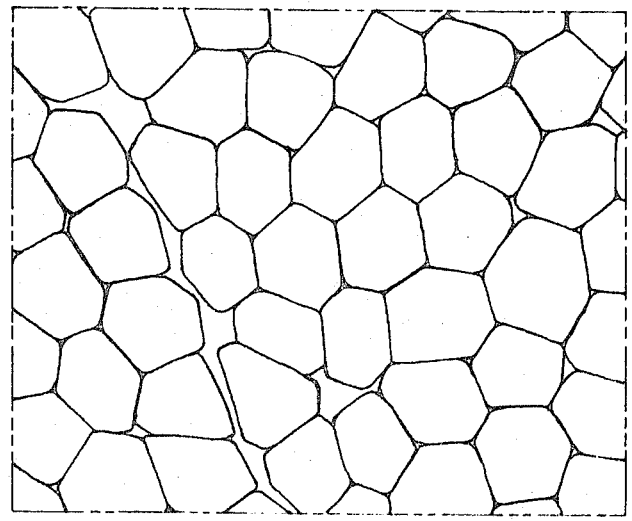
FIG. 8 is a similar cross section of a portion of a textile cord such as shown in FIG. 7 which has been coated with an adhesive and hot-stretched according to conventional tire cord processing methods.

FIG. 6 shows diagramatically a typical tire manufacturing process according to the invention wherein a fabric web comprising parallel longitudinal cords formed of textile fibers such as nylon or polyester is first treated according to conventional practices well known in the art prior to being embedded in uncured rubber. FIG. 7 illustrates the condition of the fibers or filaments of a typical nylon cord before being processed. It will be seen that the fibers are generally round in cross section and define interstices extending generally longitudinally of the cord. The treatment shown includes dipping the fabric web in an aqueous dip to coat the cords with an adhesive that serves to bond the cords to the rubber during the vulcanizing process. Immediately thereafter the web is conveyed by rolls through a drying step and then passes through a heat treating oven. As the web leaves the oven it is normally cooled by the ambient air to room temperature. At this stage the cords, particularly those formed of nylon and polyester fibers, are very stiff. FIG. 8 illustrates the condition of a nylon cord processed according to conventional practices and it will be seen that the cross section of the fibers is generally hexagonal in form and that the volume of the interstices shown in FIG. 7 is greatly diminished. Also the adjacent surfaces of the fibers conform closely to one another.

According to the method of the invention, a fabric flexing apparatus such as one of the two types described above is located in the path of travel of the fabric web and the web is drawn across one or more flexing edges of the apparatus while under tension. The tension in the cords may vary depending on the size of the cord and the type of fiber. Where a relatively low tension is used such as less than 1 lb. per cord, improved results can be obtained by passing the cords across more than one flexing edge.

Figure 9:
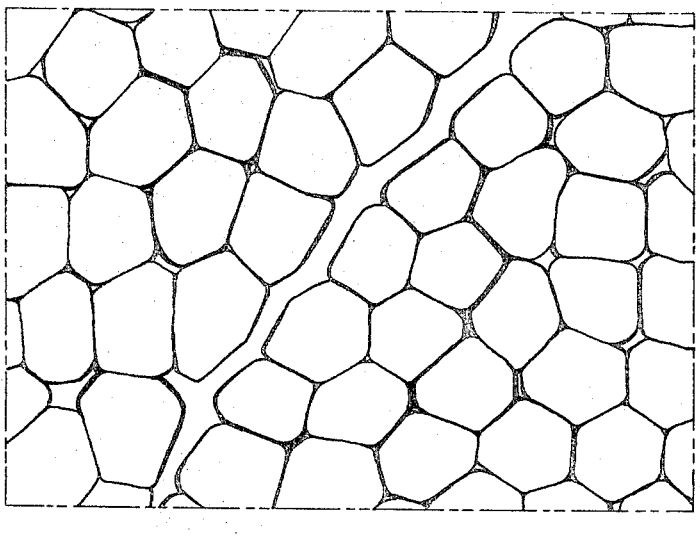
FIG. 9 is a similar cross section of a portion of a textile cord which has been subsequently treated according to the invention.

The flexing serves to greatly reduce the stiffness of the cords and appears to render the cords more pervious to gas. FIG. 9 illustrates the condition of the cord of FIGS. 7 and 8 after being processed according to the method of the invention. It will be seen that the fibers are not as tightly compacted as those of FIG. 8 and it appears that the volume of the interstices between the fibers has increased. It appears probable that any tendency of the fibers to adhere to each other is diminished by the treatment. The reduction in stiffness is readily apparent from a visual comparison of the tendency of a cord to bend under its own weight. An untreated cord will resist bending under its own weight to a considerable extent while in comparison a treated cord is quite limp and has very little resistance to bend.

After the fabric has been so treated it is conveyed to a calendering unit where a layer of rubber is applied to form a reinforced rubber sheet (FIG. 6). The resulting rubber sheet material is normally cut diagonally and spliced as is common in the tire building art, or otherwise processed, after which it may be cut to size and used in the construction of an uncured rubber laminate such as a pneumatic tire. The laminate is then vulcanized according to standard practices in the art.

The improved flexibility of the ply material facilitates the forming of the rubber laminate and reduces the tendency of any gas trapped between the ply to damage the walls of the tire carcass, the pervious cords tending to provide a reservoir for the expanding gas.

The method of the invention is also beneficial in the processing of textile cords used in reinforcing rubber laminates where the cords are not coated with an adhesive, such as where a bond producing chemical is added to the rubber composition which is calendered onto the cords.

While the invention is especially adapted to reduce the stiffness of the cords it has been found that flexing also improves fatigue resistance.

The practice of the invention and the advantages deriving therefrom may be better understood from the following examples:

EXAMPLE 1

Two fabric webs each 52" wide and comprising about 1980 parallel continuous tire cords of N–44 nylon, 1300/2 (in other words each cord was made up of two yarns of 1300 denier each) were processed under two different sets of conditions, one set being according to conventional prior art practices and the other set being according to the method of the invention.

The conventional process comprised dipping the fabric web in an aqueous dip where it was coated with an adhesive, drying the web and thereafter hot-stretching the web in a conventional hot-stretching oven. The web was then passed through calender rolls where a layer of uncured rubber was applied to both sides to form an elongated rubber sheet. The sheet was cut on a diagonal into separate sections and spliced along splice lines parallel to the cords. The resulting product was used to form the plies of a pneumatic tire according to methods well known in the art.

The other fabric web was processed according to the conventional practice indicated above except that after heat treating it was treated according to the method of the invention. The treatment comprised passing the web at a rate of 5 yds. per min. across one of the longitudinal edges of each of three stationary two-inch square steel flexing bars. Each edge over which the web passed flexed the web to define an included angle of about 120°, the web following a zig-zag path of travel between the three bars. A web tension of about 900 lbs. (or about .5 lb. per cord) was maintained throughout the passing of the fabric across the bars. The cords had a diameter of about .030 inch.

Prior to calendering the fabric of both the conventionally processed web and the web passed through the flexing bars, was tested to determine and compare certain physical characteristics. The specific tests and data obtained therefrom are shown below in Table I.

TABLE I

| Test | Conventionally processed cords | Cords passed through flexing bars |
|---|---|---|
| Break strength: | | |
| Lbs | 44.4 | 44.4 |
| Load at 5% elongation | 19.0 | 19.5 |
| Modulus, lbs. (load at 10% elongation) | 43.8 | 43.7 |
| Elongation at break (percent) | 14.6 | 19.7 |
| Stiffness (mg./cord) | 245.0 | 112.6 |
| Durability (kc.) | 113.0 | 139.0 |

In Table I, the break strength, modulus, and elongation at break were measured using an Instron Tensile Tester, the measurements being taken with specimen cords which had been kept in a desiccant atmosphere for 24 hours before testing. The two modulus measurements represent the load first at an elongation of 5% and then at an elongation of 10%. The break strength and elongation at break of each cord tested were measured according to standard practice.

The stiffness of the specimen cords was measured using a Gurley Stiffness Tester (Motor Operated Model No. 4171) sold by W. and L. E. Gurley Inc. of Troy, N.Y. One inch wide specimens of fabrics were used to obtain a stiffness measurement in milligrams per inch. The figure obtained was then divided by the number of cords per inch to obtain the stiffness in milligrams per cord.

The durability was measured according to a method described as "Goodyear Tube Fatigue Method" on pages 185 through 188 of "1966 Book of ASTM Standards—Part 24—Textile Materials—Yarns, Fabrics and General Methods" published by American Society For Testing and Materials, 1916 Race St., Philadelphia, Pa.

The data in Table I indicates the unexpected improvement in physical properties of the cords deriving from the method of the invention. The improvement in fatigue resistance or durability was the most surprising. No undesirable effects were noted. Tires constructed with the fabric web treated according to the method of the invention were easier to fabricate (especially as to the folding of the plies around the beads) and defects resulting from entrapped air were reduced markedly and in many cases eliminated.

EXAMPLE II

Several 1260/3, Nylon 66 tire cords which had been coated with an adhesive and hot-stretched according to conventional practice, were tested before and after being flexed under varying conditions of tension, using laboratory apparatus adapted for practicing the method of the invention. Each cord had a diameter of about .027 inch and was secured at one end to a weight of from 1.0 to 5.0 lbs. With the weight serving to tension the cord, the cords were drawn one time over a rod having a diameter of .106 inch, which flexed the moving cord so as to define an included angle of about 90°.

The stiffness of each cord after the pass over the rod was determined and recorded, the measurements being made on a Gurley Stiffness Tester. The results were compared with corresponding measurements made with unflexed cords.

The test results are presented in Table II below.

TABLE II

| Tension (lbs.) | Stiffness (milligrams) | | Reduction in stiffness (percent) |
|---|---|---|---|
| | Unflexed cord | Flexed cord | |
| 1 | 78.4 | 21.8 | 72.2 |
| 2 | 78.4 | 21.1 | 73.1 |
| 3 | 78.4 | 21.4 | 72.7 |
| 4 | 78.4 | 27.4 | 65.1 |

Another set of tests was made using the same procedure with the nylon cords subjected to a tension of 1 lb. in each case but with rods of different diameters. The test results are presented in Table III below.

TABLE III

| Rod diameter (inches) | Stiffness (milligrams) | | Reduction in stiffness (percent) |
|---|---|---|---|
| | Unflexed cord | Flexed cord | |
| .106 | 78.4 | 21.8 | 72.2 |
| .249 | 78.4 | 31.1 | 60.3 |
| .375 | 78.4 | 66.6 | 15.1 |

From Tables II and III it will be seen that the stiffness of a previously conventionally hot-stretched, or heat treated, and adhesive coated nylon cord is very materially decreased by processing of the cord in accordance with this invention. At the same time the desired physical characteristics of the cord are not adversely affected and at least some may be enhanced. The method of achieving this marked increase in flexibility of tire cord or fabric and the results obtained are dependent on several factors. These factors include the cord material, diameter, and construction; the cord-to-rubber bonding agent or adhesive, if used; the previous heat treatment of the cords; the tension the cord during the processing in accordance with this invention; the included angle of the cord defined by the portions of the cord immediately adjacent the opposite ends of the flexing edge; the radius of curvature of the flexing edge, or more particularly sharpness of the bending of the cord; and the frequency of bends per inch of cord provided along the cord.

Where it is desired to incorporate this invention in an existing cord processing unit by modification of existing apparatus and without changing the overall operation of the system, it might be considered that the cord physical characteristics including the cord material, dimensions, etc., are constant, as are the previous heat treatment of the cord, the adhesive used, or the lack of such adhesive, the cord tension and the temperature and lineal speed of the cord. In that event the degree of flexibility increase which will be obtained will be directly related to the degree of bending of the cord and to the sharpness of the bending of the cord which is determined by the degree of bending and the radius of curvature at the bend. For example, and with reference to FIG. 10, if a cord C is partially wrapped about a flex inducing member F, which for purposes of illustration is a circular cross-sectioned bar having a radius $R_1$, the radii of the bar at the points of tangency of the cord to the bar will define what may be referred to as the wrap angle $X_1$ of the cord. Also the portion of the cord extending from the bar from the points of tangency thereto will define an included angle $Y_1$. The angle $Y_1$ is the supplement of the wrap angle, or in other words when the wrap angle is 80° the included angle will be 100°. Also, the included angle $Y_1$ is the supplement of the angle $Z_1$, which is the angle that the cord is bent and represents the change in direction of the cord over the bend. It will be seen that the wrap angle $X_1$ and the bend angle $Z_1$ are equal.

Figure 10:
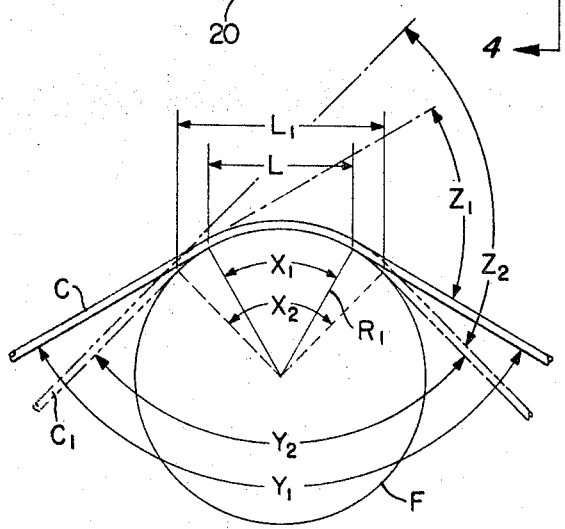
FIG. 10 is a view illustrating in diagrammatic form the angular relationships involved in the flexing of a textile cord according to the invention.
Figure 11:
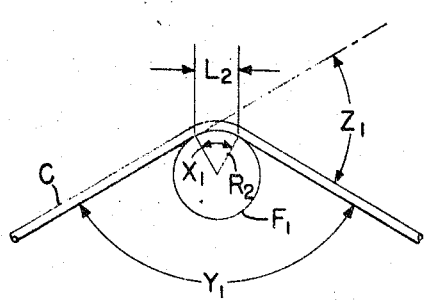
FIG. 11 is a view similar to FIG. 10 and on the same scale, illustrating the angular relationships involved in the flexing of a textile cord according to the invention but with a smaller radius of curvature.

For a given bar radius $R_1$ and a given included angle $Y_1$ the cord will engage the bar over an arcuate dimension or length of contact indicated at L. The length of contact as indicated at L and the included angle $Y_1$ will determine the extent of bending as well as the sharpness or rate of bend of the cord. For example, and with reference to FIG. 10, if the cord C with a bend angle $Z_1$ and a length of contact as indicated at L undergoes a given increase in flexibility, a greater increase in flexibility will be obtained if the wrap angle is increased to that shown in broken lines in FIG. 10, even through the radius of curvature over the bend (or $R_1$) is maintained constant. This is because the bend angle $Z_2$ is larger. However, in this instance the sharpness of bending of the cord will not be increased. On the other hand, and with reference to FIG. 11, if the same cord C is engaged over a bar $F_1$ having a radius $R_2$ which is smaller than the radius $R_1$ of the bar F of FIG. 10 and assuming the bend angle $Z_1$ and the wrap angle $Y_1$ are maintained, the same as indicated in FIG. 10, the length of contact over the bend, as indicated at L-2, will be smaller than the length of contact indicated at L; thus the rate of change of direction of the cord over the portion thereof undergoing the bend, or in other words the sharpness of the bend, is increased, resulting in an increase in the flexibility obtained.

The foregoing is further illustrated by reference to Table III wherein it will be observed that the reduction in stiffness decreased as the rod diameter was increased and the cord tension and bend angle maintained constant. Accordingly, one may vary the flexibility increase obtained by this invention by varying either or both of the bend angle Z and the length of the cord over which the change in direction or bending is accomplished Generally speaking, the sharpness of bending should be sufficiently high to accomplish the desired flexibility increase but not so high as to result in damage to the cord.

As noted above, the particular bend angle and radius of bend, may vary with, or depending on, other factors mentioned above as affecting the degree of increase in flexibility obtained. For example, the foregoing Tables I, II, and III dealt with increasing the flexibility of nylon cord. The invention is equally applicable to cords of polyester or other thermoplastic materials suitable for use in tire cords. Also the invention may be advantageously used in connection with other tire cord materials where an increase in flexibility of the cord fabric is necessary, or desirable. In this connection, while the reason for the marked increase in flexibility of nylon and polyester cords obtained by the use of this invention is not completely understood, it is believed that it is due primarily to two factors. Firstly, where a cord-to-rubber bonding agent is applied to a cord made of a multiplicity of very fine filaments, the bonding agent tends to provide a film over the cord and also tends to penetrate into the cord. The degree of penetration of the adhesive into the cord may vary from a small amount to complete penetration so that each of the filaments is coated. The latter situation may be the case where the cord material is glass, and it is desired to coat each filament to prevent abrading engagement between adjacent filaments. In any event, the adhesive, when dried, not only tends to prevent gases from penetrating the cord but also becomes brittle and may contribute to a very substantial degree to the stiffness of the cord. When adhesive coated cord is treated in accordance with this invention there is a tendency to provide micro fractures in the film over the cord and also a tendency for any adhesive bonds between filaments to be broken so as materially to reduce the stiffness of the cord occasioned by the adhesive. Also the sharp bending of the cord is believed to effect a change in the physical characteristics of the adhesive rendering it more flexible. In the processing of tire cord or tire cord fabric, it is normally the practice to hot-stretch, or heat treat, the cord or fabric. This treatment is usually performed after the filaments have been formed into a cord. In many cord processing operations the cords are coated and heat treated twice, in which case the flexing of the cord may be accomplished after each separate heat treatment or only after the last. The purpose of hot-stretching or heat-treating tire cord varies with the type of material being used. However, hot-stretching is primarily used to accomplish (1) a modification of the internal structure of the fiber to obtain a desired change in physical properties, or (2) an elongation of the cord to reduce its potential elongation in use, or (3) equalizing of the tension on the individual filaments or fibers to obtain an improvement in the tensile strength of the cord. Therefore, where the term hot-stretching or heat treatment is used herein, it is intended to refer to a treatment wherein the material is heated and placed under tension for the purpose of obtaining one or more of the results set forth above.

When cords of thermoplastic material such as nylon, or polyester, are hot-stretched, the filaments undergo a change in cross-sectional geometry. With reference to FIG. 7, it has been mentioned that there is therein shown the cross-section of a portion of a nylon tire cord prior to the hot-stretching thereof. It will be seen that the filaments are generally circular in cross-section with each filament normally contacting one or more adjacent filaments. It will be appreciated, however, that in this condition of the cord the filaments are relatively free to move each relative to the others and the cord is relatively flexible. With reference to FIG. 8 there is shown a cross-section of the same cord as represented in FIG. 7, but after the cord has been hot-stretched in a conventional manner. It will be readily apparent that the hot stretching operation has resulted in a very substantial deformation of the filaments so that they are now polygonal in cross-section being for the most part hexagonal. By and large each flat face of each filament is engaged with a flat face of an adjacent filament and the filaments are now generally in close engagement somewhat in the nature of a jigsaw puzzle. The cord represented in FIG. 8 is very much stiffer as compared to the cord represented in FIG. 7. It is believed that the very substantial increase in stiffness is brought about in part by the generally interlocking relationship of the filaments which results from the hot-stretching operation. Also, it is believed that there is a bond at the interfaces between the filaments which bond may be mechanical, chemical, or both. Further, and as noted above, to the extent that adhesive is present on the filaments being considered, the adhesive itself tends to bond the filaments together and in itself contributes to an increased stiffness of the cord. With reference to FIG. 9 there is illustrated a cross-section of the cord of FIG. 8 after being processed in accordance with this invention. It would appear from a consideration of FIG. 9 that the sharp bending of the cord when it is processed according to this invention has resulted in the breaking of a very substantial number of any bonds between the flat interfaces between the filaments and caused increased spacing between the filaments. It is further believed that the sharp bending that the cord undergoes in processing according to this invention cracks or fractures any adhesive films on the filaments thus reducing stiffness of the cord contributed by such film. The foregoing explanation of the reasons for the improvement of flexibility obtained with this invention would seem to be borne out when it is considered that the training of a previously hot-stretched tensioned cord around the usual sizes of rolls of conventional cord processing apparatus does not apparently affect the stiffness of the cord or fabric due to the lack of a sharp flexing or bending of the cord.

It should also be mentioned that the treatment of cord or fabric according to this invention results in the tendency of the cord cross-section to depart from a generally circular shape and become more elliptical with the major axis of the ellipse being parallel to the general plane of the fabric. This, of course, will tend to reduce the bending modulus of the cord to provide increased ease of bending the fabric out of its general plane.

From the foregoing it should be apparent that where the term "thermoplastic" is used in connection with tire and materials to be treated by this invention, the term is being used primarily in the sense that a filament of such material, when heated and tensioned in any manner used to process tire cords, will be deformed generally in the manner described in connection with FIGS. 7 and 8.

As has been noted above there are other factors that affect the degree of flexibility achieved with the process of this invention. The material from which the cord filaments are made will inherently provide a degree of stiffness dependent upon the particular material. The cord diameter, as it increases, will result in greater absolute values of stiffness, and the degree of bending or sharpness of bending may vary with cord diameter. Further the cord construction will, to some extent, affect the manner of treatment. For example, a cord consisting of two bundles of filaments or yarn may react differently than a cord consisting of three yarns. The cord-to-rubber bonding agent used will of its own nature contribute to a varying degree to increased stiffness of the cord and thus determine to some extent the amount by which the stiffness may be reduced by the treatment of this invention. Of course, if such an adhesive is not used, the initial cord stiffness prior to treatment by the method of this invention will be less than if an adhesive were used. Previous heat treatment to which the cord has been exposed will also determine the absolute stiffness of the fabric before treatment in accordance with this invention. For example, and generally speaking, a nylon cord which is stretched approximately 10 percent in a hot-stretching operation will have a substantially greater stiffness than one stretched 6 percent. As far as frequency of bending of the cord is concerned, the specific embodiments described above contemplate a bending of the cord continuously along its length. However, this is not to say that it is not contemplated that the cord may be flexed at specified locations or incrementally along the cord rather than continuously, and in either event, the cord is flexed progressively along it length. These factors should be considered when determining an optimum arrangement of a cord flexing apparatus to practice this invention and in determining the bend angle, wrap angle and radius curvature, radius of bend of the cord, etc.

However, using the foregoing specific examples, it is believed clearly apparent that one skilled in the art can for any specific cord arrive at a very satisfactory improvement in flexibility with a very minimum of effort. For example, and in comparison to the data set forth in Tables II and III above which dealt with nylon cord, similar tests were conducted on polyester tire cord of 1300/3 construction; that is to say, 3 yarns of 1300 denier each. In these tests, which were conducted in the same manner as the tests the results of which are shown in Tables II and III hereof, the previously heat treated and adhesive coated cord had a stiffness approximately of 175. After treatment in accordance with the invention using a rod diameter of .106 inch and a tension of 1 lb. the cord had a stiffness of approximately 33. There was thus achieved approximately an 80 percent reduction in stiffness when the polyester cord was treated in accordance with this invention.

As discussed above the invention is particularly adapted for use in processing tire cord. However, as also indicated it may have broader application to other cords such as used in reinforcing others types of rubber laminates. Also, where the term ruber is used, we mean to include natural or synthetic rubber or blends thereof as well as other materials having similar characteristics and uses.

It will be understood that the invention has been shown and described with reference to preferred embodiments thereof which are intended for the purpose of illustration rather than limitation and other variations and modifications will be apparent to those skilled in the art within the intended spirit and scope of the invention, wherefor the patent is not to be limited to the form herein specifically illustrated and described nor in any other manner inconsistent with the progress by which the art has been promoted by this invention.

We claim:

1. A method of manufacturing a rubber article incorporating a plurality of parallel, continuous, filamentary, reinforcing cords comprising: prior to incorporating said cords in said article, applying a liquid cord-to-rubber bonding agent to said cords; drying said agent; subsequent to the drying of said agent, reducing the stiffness of the cords at least about 15 percent by sufficiently sharply flexing the cords progressively along their length while maintaining the cords under a tension of between .5 and 4 pounds per cord; and thereafter embedding said cords in rubber.

2. In a method claim 1, said flexing of the cords being accomplished by effecting relative movement, in a direction longitudinally of the cords, between the cords and a cord flexing member extending laterally of the cords while said cords are engaged with said cord flexing member and with the portions of the cords on opposite sides of said cord flexing member defining an included angle substantially less than 180 degrees.

3. In the method as described in claim 2, said cord flexing member having a cord engageable surface having a radius of curvature of about .050 inch.

4. A method of manufacturing a rubber article incorporating a plurality of parallel, thermoplastic, continuous, filamentary, reinforcing cords comprising: prior to incorporating said cords in said article, hot-stretching said cords; subsequent to said hot-stretching, reducing the stiffness of said cords at least about 15 percent by sufficiently sharply flexing the cords progressively along their length while maintaining the cords under a tension of between .5 and 4 pounds per cord; and the thereafter embedding said cords in rubber.

5. In the method as described in claim 4, the flexing of the cords being accomplished by effecting relative movement, in a direction longitudinally of the cords, between the cords and a cord flexing member extending laterally of the cords while said cords are engaged with said cord flexing member and with the portions of the cords on opposite sides of said cord flexing member defining an included angle substantially less than 180 degrees.

6. In the method as described in claim 5, said cord flexing member having a cord engageable surface having a radius of curvature of about .050 inch.

7. In the method as described in claim 4, the further steps of, prior to hot stretching said cords, applying a liquid cord-to-rubber bonding agent to said cords, and drying said agent on said cords.

8. In the method described in claim 7, said flexing of the cords being accomplished by moving said cords continuously in a direction longitudinally of the cords and across a cord flexing member extending laterally of the cords while said cords are engaged with said cord flexing member and while the portions of said cords on opposite sides of said cord flexing member define an included angle substantially less than 180 degrees.

9. In the method as described in claim 8, the cord engaging surface of said cord flexing member having a radius of curvature of approximately .050 inch.

References Cited

UNITED STATES PATENTS

| | | | |
|---|---|---|---|
| 1,520,342 | 12/1924 | Grabau | 161—176 |
| 2,509,741 | 5/1950 | Miles | 156—229(UX) |
| 3,042,568 | 7/1962 | Ludowici et al. | 156—229X |
| 3,346,931 | 10/1967 | Kashima et al. | 28—1 |
| 3,377,673 | 4/1968 | Stoller | 28—1 |
| 1,660,204 | 2/1928 | Moses | 117—7 |
| 1,823,620 | 9/1931 | Mayo et al. | 118—124 |
| 2,514,145 | 7/1950 | Stevens | 117—62X |
| 2,846,752 | 8/1958 | Lessig | 28—75X |
| 2,898,664 | 8/1959 | Salem | 117—7X |

FOREIGN PATENTS

| | | | |
|---|---|---|---|
| 617,508 | 4/1961 | Canada | 156—229 |
| 465,875 | 5/1937 | Great Britain. | |
| 465,939 | 5/1937 | Great Britain. | |
| 485,182 | 5/1938 | Great Britain. | |
| 485,199 | 5/1938 | Great Britain. | |

BENJAMIN A. BORCHELT, Primary Examiner

S. C. BENTLEY, Assistant Examiner

U.S. Cl. X.R.

28—75; 156—110, 229